United States Patent
D'Amico et al.

(10) Patent No.: US 6,741,554 B2
(45) Date of Patent: May 25, 2004

(54) METHOD AND APPARATUS FOR RELIABLY COMMUNICATING INFORMATION PACKETS IN A WIRELESS COMMUNICATION NETWORK

(75) Inventors: Thomas Victor D'Amico, Palatine, IL (US); Floyd D. Simpson, Lake Worth, FL (US); Paul E. Gorday, West Palm Beach, FL (US)

(73) Assignee: Motorola Inc., Schaumburg, IL (US)

( * ) Notice: Subject to any disclaimer, the term of this patent is extended or adjusted under 35 U.S.C. 154(b) by 11 days.

(21) Appl. No.: 10/222,317

(22) Filed: Aug. 16, 2002

(65) Prior Publication Data

US 2004/0032853 A1 Feb. 19, 2004

(51) Int. Cl.[7] .............................................. H04L 1/16
(52) U.S. Cl. ................ 370/225; 370/278; 370/349; 714/749
(58) Field of Search ................. 370/216, 225, 370/227, 228, 276, 277, 278, 279, 280, 281, 294, 295, 310, 313, 314, 343, 344, 345, 349; 709/230, 236, 238, 239, 240; 714/748, 749

(56) References Cited

U.S. PATENT DOCUMENTS

| | | | |
|---|---|---|---|
| 5,081,671 A | | 1/1992 | Raith et al. |
| 5,134,710 A | * | 7/1992 | Akerberg ................ 455/41.2 |
| 5,546,411 A | * | 8/1996 | Leitch et al. ............. 714/708 |
| 5,896,402 A | * | 4/1999 | Kurobe et al. ........... 714/748 |
| 5,913,167 A | | 6/1999 | Bonta et al. |
| 5,940,769 A | * | 8/1999 | Nakajima et al. ......... 455/509 |
| 6,052,385 A | * | 4/2000 | Kanerva et al. .......... 370/468 |
| 6,208,620 B1 | * | 3/2001 | Sen et al. ................ 370/231 |
| 6,587,441 B1 | * | 7/2003 | Urban et al. ............. 370/310 |
| 6,636,488 B1 | * | 10/2003 | Varma .................... 370/278 |

* cited by examiner

*Primary Examiner*—Hassan Kizou
*Assistant Examiner*—Dmitry Levitan
(74) *Attorney, Agent, or Firm*—Sylvia Chen

(57) ABSTRACT

A wireless communication network (100) employs a method and apparatus for reliably communicating information packets in the network. A first wireless device (101) in the network transmits an information packet to a second wireless device (e.g., 102) in the network over a first wireless communication channel (403, 404). The first device then determines whether the information packet was successfully received (e.g., received without errors) by the second device. If the information packet was not successfully received, the first device retransmits the information packet to the second device over a second wireless communication channel (405, 406). In addition, and preferably substantially contemporaneous with retransmission of the first information packet, the first device transmits a second information packet to the second device over the first channel in an effort to communicate an information sequence to the second device without delays typically associated with use of a reliable protocol.

29 Claims, 6 Drawing Sheets

METHOD AND APPARATUS FOR RELIABLY COMMUNICATING INFORMATION PACKETS IN A WIRELESS COMMUNICATION NETWORK

FIELD OF THE INVENTION

The present invention relates generally to wireless communication networks and, in particular, to reliably communicating information packets in such networks so as to account for bursts of unplanned interference.

BACKGROUND OF THE INVENTION

Wireless communication networks are known and come in a variety of forms. Notable networks include cellular telephone networks, classic land mobile radio networks and satellite transmission networks. These networks are typically characterized as wide area networks. More recently, wireless local area networks and wireless home networks have been proposed, and standards, such as Bluetooth and IEEE 802.11, have been introduced to govern the development of wireless equipment for such localized networks.

Most wide area networks operate using licensed frequencies that have been allocated for such use by a governmental agency, such as the United States Federal Communications Commission. Consequently, network designers and planners can use conventional system planning software tools to predict interference patterns and design their systems to mitigate the effects of interference (e.g., through appropriate selection of reuse patterns and propagation modeling).

By contrast, proposed wireless home networks will use unlicensed frequency spectrum most likely in the newly opened five Gigahertz (5 GHz) frequency range. Consequently, each wireless home network has the possibility of encountering substantial, unpredictable interference due to the presence of neighboring home networks (e.g., in apartment buildings, condominiums, and town homes) operating on common frequencies. Adding further to the complexity of wireless home networks, such networks will likely be required to support real-time information, such as audio and video services, in such a manner that users of the networks cannot notably distinguish the reception of real-time information (e.g., a cable television signal or a cordless telephone signal) over a wireless home network from the reception of such information over a typical wired or cabled network. In other words, users of wireless home networks will expect the same quality of service with wireless home networks as they currently receive from their wired networks. The provision of such quality of service is rendered quite difficult in an environment of unpredictable interference that can unexpectedly corrupt transmitted information.

Various methods exist for reliably communicating information in wireless networks. Wide area data networks commonly utilize automatic repeat request (ARQ) or selective ARQ (SARQ) schemes in which a transmitting device retransmits unacknowledged or negatively acknowledged data packets or portions thereof to a receiving device over a traffic channel assigned for the data communication in the event that the data packets or the data packet portions are received with errors by the receiving device. While such schemes do provide a mechanism for insuring reliable communications, they also introduce delays that are unacceptable for the transmission of real-time information because retransmission under an ARQ or SARQ scheme requires a temporary stoppage or interruption in the transmission of the data stream. If applied to the transmission of real-time information, such stoppages would produce user-noticeable aberrations in the received information stream (e.g., silence in an audio transmission or jitter in a video transmission), likely resulting in user discontent.

Some cellular networks allocate a group of secondary traffic channels in each cell for emergency use in the event that the signal qualities of primary traffic channels degrade significantly during voice calls. In such networks, when the signal quality of a primary traffic channel degrades to such a degree that the system controller would ordinarily drop or terminate the call, the system controller attempts to re-assign the call to one of the secondary traffic channels. If a secondary channel is available, the system controller re-assigns the call to the secondary channel and the call continues; otherwise, the call is dropped or terminated. In either event, the primary traffic channel is de-allocated and becomes available for a new call. While the allocation and use of a secondary traffic channel facilitates continuation of the call, it does not insure the reliability of the transmitted information. That is, any information that is lost during the transition from the primary traffic channel to the secondary traffic channel is never recovered.

Therefore, a need exists for a method and apparatus for reliably communicating information packets in a wireless communication network that facilitate the transmission of real-time information, without introducing undesirable delays that could negatively impact the high quality of service typically expected by users of such information.

DETAILED DESCRIPTION OF A PREFERRED EMBODIMENT

Generally, the present invention encompasses a method and apparatus for reliably communicating information packets in a wireless communication network. A first wireless device in the network (e.g., a wireless base transceiver station system) transmits an information packet to a second wireless device in the network (e.g., a wireless audio/video device) over a first wireless communication channel. The first device determines (e.g., via an acknowledgment received from the second device) whether the information packet was successfully received by the second device. If the information packet was not successfully received by the second device, the first device retransmits the information packet to the second device over a second wireless communication channel. In addition, and preferably substantially contemporaneous with retransmission of the first information packet, the first device transmits a second information packet to the second device over the first channel in an effort to communicate an information sequence to the second device with minimal delay associated with use of a reliable protocol. By temporarily utilizing a second wireless channel to communicate corrupted information packets, the present invention facilitates reliable communication of real-time information, such as audio and video information, without introducing undesirable delays that could negatively impact the high quality of service typically expected by real-time information users.

Figure 1:
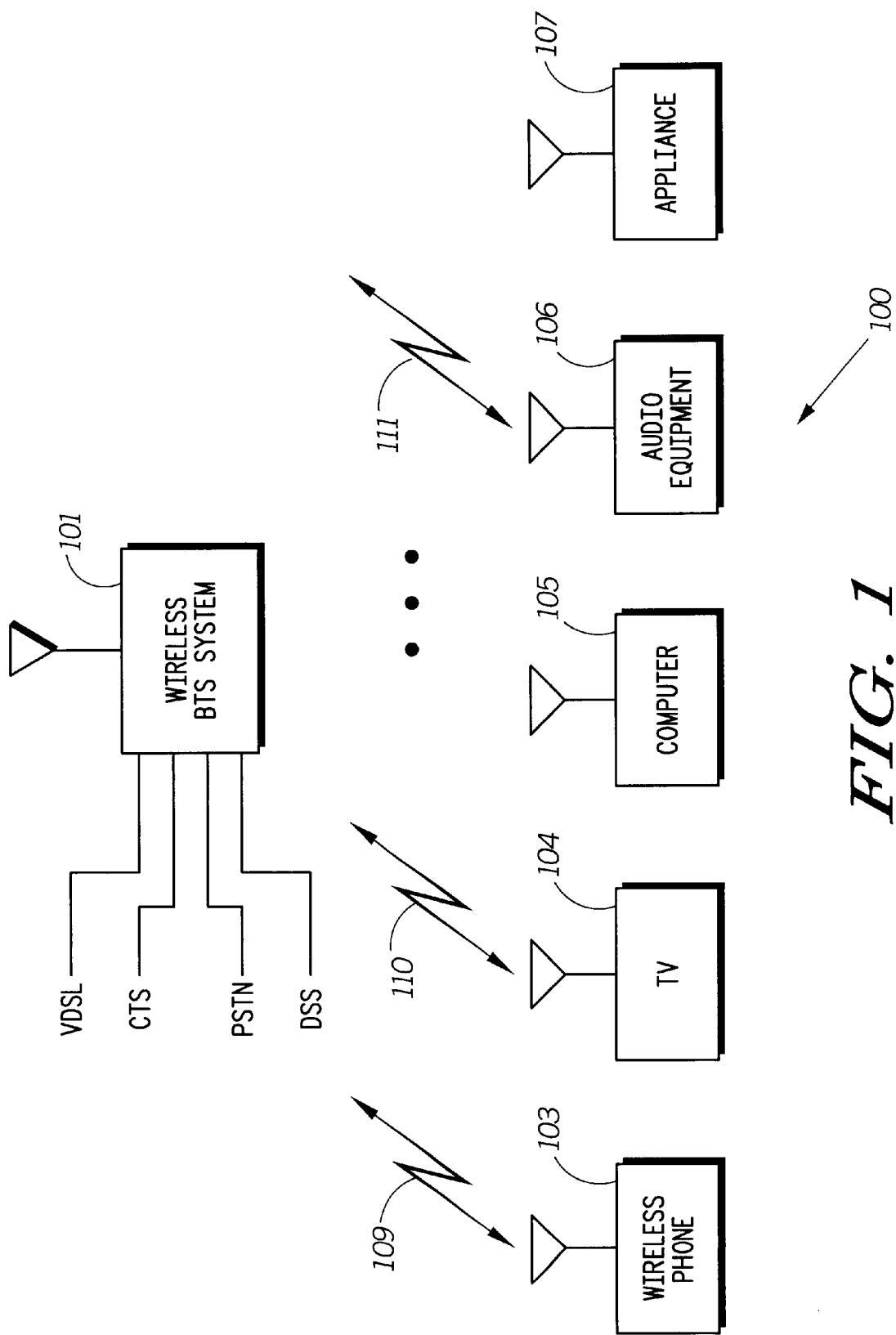
FIG. 1 is a block diagram of a wireless communication network in accordance with the present invention.

The present invention can be more fully understood with reference to FIGS. 1–7, in which like reference numerals designate like items. FIG. 1 is a block diagram of a wireless communication network 100 in accordance with the present invention. The wireless communication network 100 includes a plurality of wireless devices, such as a wireless base transceiver station (BTS) system 101 and one or more wireless electronic devices 103–107 (five shown for illustration purposes). The wireless devices 101–107 communicate information packets in the network 100 over wireless carrier frequencies 109–111, each of which includes one or more wireless communication channels depending on the multiple access scheme utilized in the network 100.

The multiple access scheme used in the network 100 may be any one or more of time division multiple access (TDMA), direct sequence or frequency hopping code division multiple access (CDMA), frequency division multiple access (FDMA), orthogonal frequency division multiplexing (OFDM), opportunity division multiple access (ODMA), a combination of any of the foregoing multiple access technologies, a multiple access technology in which portions of the frequency spectrum to be used are determined by local signal quality measurements and in which multiple portions of the frequency spectrum may be used simultaneously, or any other multiple access or multiplexing methodology or combination thereof. In the preferred embodiment, the wireless communication network 100 employs a TDMA access scheme that utilizes time division duplex (TDD) wireless channels on each carrier frequency to implement primary and secondary (rescue) channels, as later described.

The wireless communication network 100 is preferably a wireless home network or wireless local area network, although the present invention is applicable to any localized or wide area wireless network. The wireless electronic devices 103–107 comprise any wireless devices capable of receiving packetized audio, video and/or data information. As illustrated in FIG. 1, each wireless electronic device 103–107 may comprise any one of the following conventional household electronic devices adapted for wireless transmissions in accordance with the present invention: a conventional cellular or cordless telephone (e.g., wireless device 103), a standard definition or high definition television (e.g., wireless device 104), a computer (e.g., wireless device 105), conventional analog or digital audio equipment (e.g., wireless device 106), and a conventional home appliance (e.g., wireless device 107). A preferred wireless electronic device 103–107 is described below with respect to FIG. 3.

The foregoing and other conventional electronic devices may be adapted for wireless transmissions in accordance with the present invention by incorporating an appropriate processor, transmitter, receiver and antenna into such devices as described in more detail below with respect to FIG. 3. Alternatively, electronic devices may be adapted for wireless use in accordance with the present invention by including a conventional hardware and software interface capable of interacting with a wireless local area network (LAN) card, such as the CISCO AIRONET 350 Series Wireless LAN Adapter that is commercially available from Cisco Systems, Inc. of San Jose, Calif., United States of America, or some other wireless transceiver card (e.g., any wireless transceiver card that complies with the Personal Computer Memory Card International Association (PCMCIA) standard) and its accompanying software. In the event that a wireless LAN or other PCMCIA card is so utilized, the wireless device 103–107 referred to herein might constitute the LAN or PCMCIA card alone or the combination of the LAN or PCMCIA card and other circuitry of the electronic device depending on the particular hardware and software implementation selected by the wireless device designer.

The wireless BTS system 101 is preferably coupled to one or more sources of audio, video and/or data information. For example, as illustrated in FIG. 1, the wireless BTS system 101 may be coupled to a very high speed digital subscriber line (VDSL) service provider for purposes of receiving audio, video, and data from the Internet, a cable termination system (CTS) for purposes of receiving cable and/or pay-per-view television programming, the public switched telephone network (PSTN) for purposes of receiving telephone calls, and a direct satellite system (DSS) for purposes of receiving satellite programming. While not expressly shown in FIG. 1, the wireless BTS system 101 may additionally or alternatively be coupled to other sources of audio, video and/or data information, such as an integrated digital services network (ISDN) service provider, an asymmetric or symmetric digital subscriber line (DSL) service provider, a fiber-to-the-home provider, or the like. A preferred embodiment of the wireless BTS system 100 is described below with respect to FIG. 2.

Figure 2:
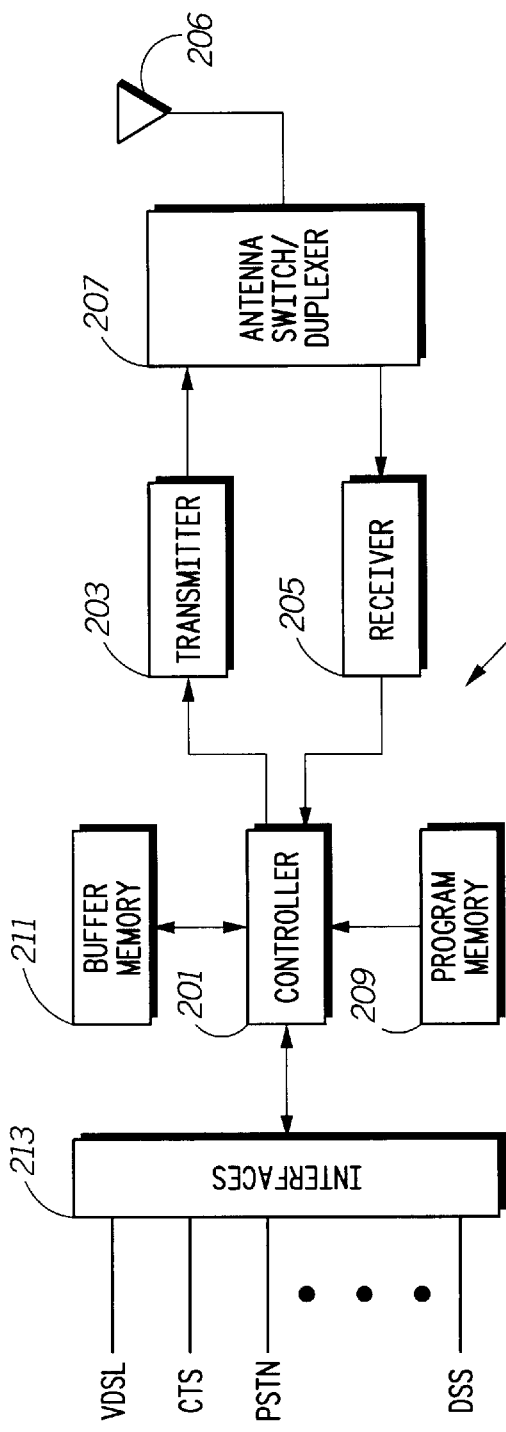
FIG. 2 is a block diagram of a wireless base transceiver station (BTS) system in accordance with the present invention.

FIG. 2 is a block diagram of a wireless BTS system 101 in accordance with the present invention. The wireless BTS system 101 includes, inter alia, a controller 201, a transmitter 203, a receiver 205, an antenna 206, a program memory 209 for storing operating instructions that are executed by the controller 201, a buffer memory 211, and appropriate hardware and software interfaces 213 to allow the controller 201 to interact with various sources of audio, video and/or data information. The wireless BTS system 101 also preferably includes an antenna switch, duplexer, circulator, or other highly isolative means (herein referred to as an "antenna switch/duplexer 207") for intermittently providing information packets from the transmitter to the antenna 206 and from the antenna 206 to the receiver 205. The wireless BTS system 101 is preferably an integrated unit containing at least all the elements 201–213 depicted in FIG. 2. Alternatively, the wireless BTS system 101 may comprise a collection of appropriately interconnected units or devices, wherein such units or devices perform functions that are equivalent to the functions performed by the elements 201–213 of the wireless BTS system 101 as described below.

The controller 201 preferably includes one or more microprocessors, microcontrollers, digital signal processors (DSPs), state machines, logic circuitry, or any other device or devices that process information based on operational or programming instructions. Such operational or programming instructions are preferably stored in the program memory 209, which memory 209 may be an integrated circuit (IC) memory chip containing any form of random access memory (RAM) or read only memory (ROM), a floppy disk, a compact disk read only memory (CD-ROM), a hard disk drive, a digital versatile disk (DVD), a flash memory card or any other medium for storing digital information. However, one of ordinary skill in the art will recognize that when the controller 201 has one or more of its functions performed by a state machine or logic circuitry, the memory 209 containing the corresponding operational instructions may be embedded within the state machine or logic circuitry. The operations performed by the controller 201 and the rest of the wireless BTS system 101 are described in detail below.

The transmitter 203 and the receiver 205 are well-known components of two-way wireless communication devices. The transmitter 203 and the receiver 205 enable the wireless BTS system 101 to communicate information packets to and acquire information packets from the other wireless devices 103–107. In this regard, the transmitter 203 and the receiver 205 include appropriate, conventional circuitry to enable digital or analog transmissions over a wireless communication channel.

The implementations of the transmitter 203 and the receiver 205 depend on the implementation of the wireless BTS system 101. For example, the transmitter 203 and the receiver 205 may be implemented as an appropriate wireless modem, or as conventional transmitting and receiving components of two-way wireless devices. In the event that the transmitter 203 and the receiver 205 are implemented as a wireless modem, the wireless modem may be located on a PCMCIA card that may be inserted into the controller 201 to facilitate wireless communications. Wireless modems are well known; thus no further discussion of them will be presented except to facilitate an understanding of the present invention. The controller 201, the transmitter 203 and the receiver 205 have been artificially partitioned herein to facilitate a better understanding of the present invention.

The antenna 206 preferably comprises any known or developed structure for radiating and receiving electromagnetic energy in the frequency range containing the wireless carrier frequencies 109–111. The buffer memory 211 may be any form of volatile memory, such as RAM, and is used for temporarily storing transmitted information packets in accordance with the present invention. The interfaces 213 are conventional hardware and/or software interfaces, including appropriate analog and/or digital modems, amplifiers, filters, encoders, decoders, and so forth, that enable the controller 201 to exchange audio, video and data information, as applicable, with various sources and sinks of such information.

Figure 3:
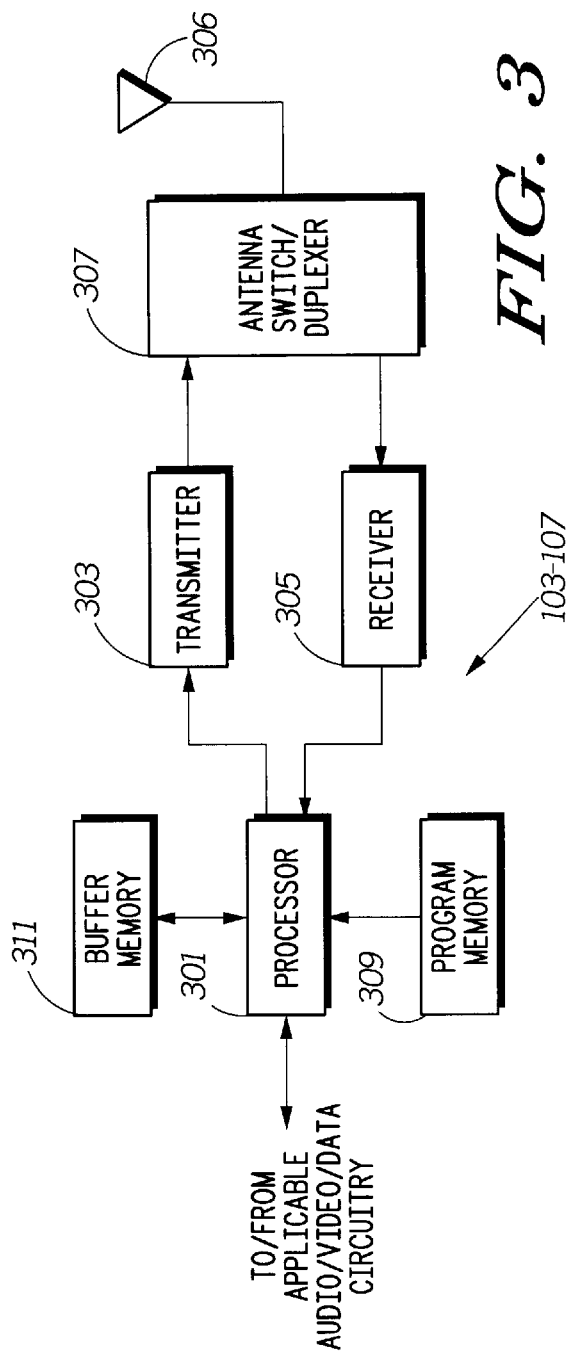
FIG. 3 is a block diagram of a wireless electronic device in accordance with the present invention.

FIG. 3 is a block diagram of a wireless electronic device 103–107 in accordance with the present invention. The wireless device 103–107 includes, inter alia, a processor 301, a transmitter 303, a receiver 305, an antenna 306, a program memory 309 for storing operating instructions that are executed by the processor 301, and a buffer memory 311. The wireless device 103–107 also preferably includes an antenna switch, duplexer, circulator, or other highly isolative means (herein referred to as an "antenna switch/duplexer 307") for intermittently providing information packets from the transmitter 303 to the antenna 306 and from the antenna 306 to the receiver 305. The wireless device 103–107 is preferably an integrated unit containing at least all the elements 301–311 depicted in FIG. 3, as well as any other elements necessary for the device 103–107 to perform its particular electronic function. Alternatively, the wireless device 103–107 may comprise a collection of appropriately interconnected units or devices, wherein such units or devices perform functions that are equivalent to the functions performed by the elements 301–311 of the wireless device 103–107 as described below. For example, wireless device 105 may comprise a laptop computer and a wireless LAN card.

The processor 301 preferably includes one or more microprocessors, microcontrollers, DSPs, state machines, logic circuitry, or any other device or devices that process information based on operational or programming instructions. Such operational or programming instructions are preferably stored in the program memory 309, which memory 309 may be an IC memory chip containing any form of RAM or ROM, a floppy disk, a CD-ROM, a hard disk drive, a DVD, a flash memory card or any other medium for storing digital information. One of ordinary skill in the art will recognize that when the processor 301 has one or more of its functions performed by a state machine or logic circuitry, the memory 309 containing the corresponding operational instructions may be embedded within the state machine or logic circuitry. The operations performed by the processor 301 and the rest of the wireless electronic device 103–107 are described in detail below.

The transmitter 303 and the receiver 305 are well-known components of two-way wireless communication devices. The transmitter 303 and the receiver 305 enable the wireless device 103–107 to communicate information packets to and acquire information packets from the other wireless devices 102–107. In this regard, the transmitter 303 and the receiver 305 include appropriate, conventional circuitry to enable digital or analog transmissions over a wireless communication channel.

The implementations of the transmitter 203 and the receiver 205 depend on the implementation of the wireless device 103–107. For example, the transmitter 303 and the receiver 305 may be implemented as an appropriate wireless modem, or as conventional transmitting and receiving components of two-way wireless devices. In the event that the transmitter 303 and the receiver 305 are implemented as a wireless modem, the modem may be internal to the wireless device 103–107 or insertable into the wireless device 103–107 (e.g., embodied in a wireless RF modem implemented on a PCMCIA card). For a wireless telephone device, such as wireless device 103, the transmitter 303 and the receiver 305 are preferably implemented as part of the wireless device hardware and software architecture in accordance with known techniques. One of ordinary skill in the art will recognize that most, if not all, of the functions of the transmitter 303 and/or the receiver 305 may be implemented in a processor, such as processor 301. However, the processor 301, the transmitter 303, and the receiver 305 have been artificially partitioned herein to facilitate a better understanding of the present invention.

The antenna 306 preferably comprises any known or developed structure for radiating and receiving electromagnetic energy in the frequency range containing the wireless carrier frequencies 109–111. The buffer memory 311 may be any form of volatile memory, such as RAM, and is used for temporarily storing received information packets in accordance with the present invention.

When the wireless device 103–107 is constructed to receive video information from a video source (e.g., a VDSL service provider, a cable provider or a DSS provider), the wireless device 103–107 preferably further includes a video decoder capable of decoding the current Moving Picture Experts Group (MPEG) standard or some other video decoding standard, such as the National Television System Committee (NTSC) standard, the Phase Alternate Line (PAL) standard or the Sequential Couleur Avec Memoire (SECAM) standard. When the wireless device 103–107 is further capable of transmitting video information, the wireless device 103–107 preferably further includes a video encoder capable of encoding the video data into at least one of the foregoing video standards. Such video encoder and decoder is preferably implemented as part of the processor 301 in accordance with known techniques.

Figure 4:
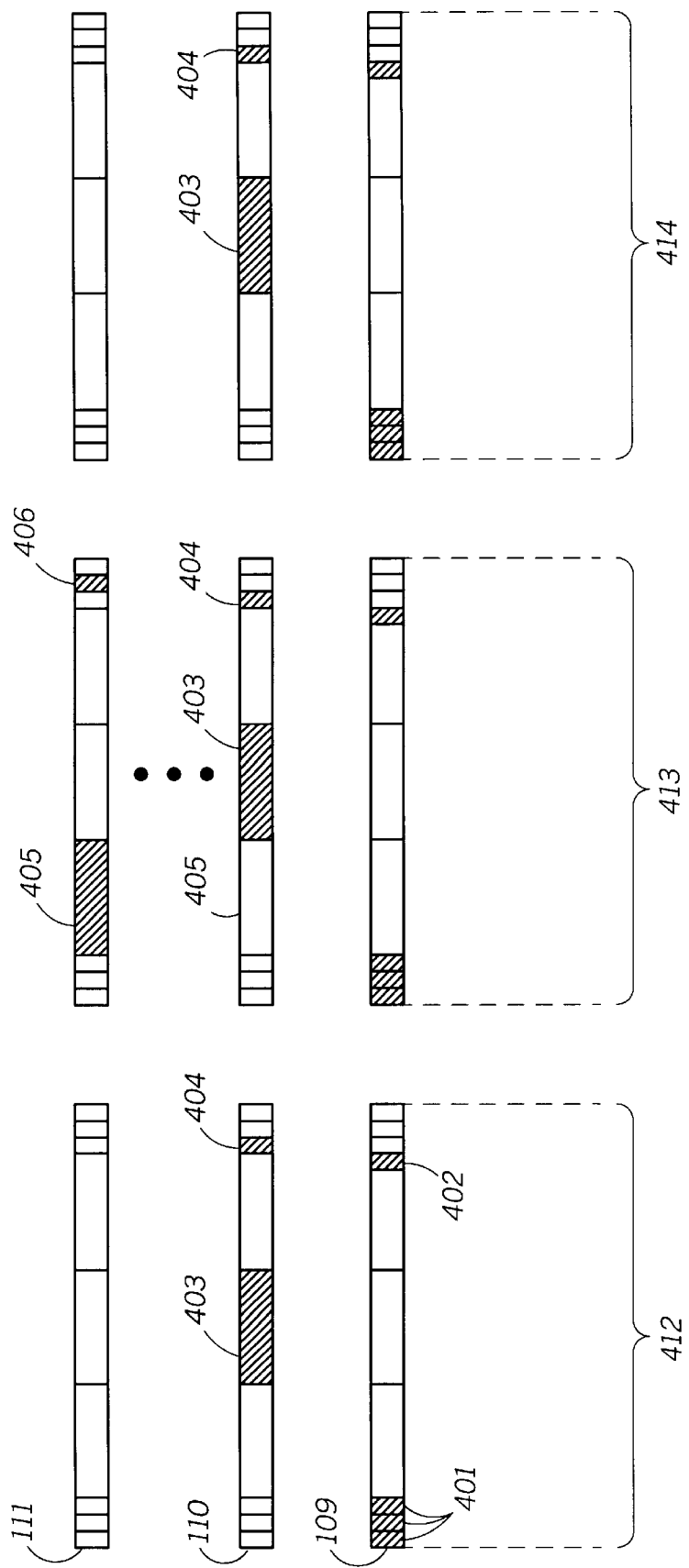
FIG. 4 illustrates exemplary time division duplex (TDD) wireless communication channels in accordance with a preferred embodiment of the present invention.

Operation of the wireless communication network 100 in accordance with a preferred embodiment of the present invention can be more fully understood with reference to FIGS. 1–4. As noted above, while the present invention is applicable for use with any multiple access scheme or channel configuration, the preferred network 100 utilizes a TDMA access scheme with TDD channels. FIG. 4 illustrates exemplary TDD channels communicated over wireless carrier frequencies 109–111 supporting a TDMA access scheme in accordance with the present invention.

As illustrated in FIG. 4, the carrier frequencies 109–111 are assigned for use by one or more wireless devices 102–107 on a time-periodic basis. Thus, the usage of each carrier frequency 109–111 is divided into time slots 401–406 arranged into periodically repetitive time frames 412–414. Each TDD channel includes a forward time slot (e.g., time slot 401 or time slot 403) and a reverse time slot (e.g., time slot 402 or time slot 404) in each assigned time frame 412–414. The forward time slot is used to transmit information packets from the wireless BTS system 101 to a wireless device 103–107; whereas, the reverse time slot is used to transmit information packets from a wireless device 103–107 to the wireless BTS system 101. Thus, in the preferred TDD channel arrangement, the reverse time slot (e.g., time slot 404) of a particular time frame (e.g., time frame 412) occurs later in time than the forward time slot (e.g., time slot 403) of the same time frame 412, but earlier in time than the commencement of the next time frame (e.g., time frame 413). The length of each time slot 401–406 depends upon the type of information and the size of the information packet to be transmitted in the particular time slot 401–406. For example, traffic information packets (e.g., audio, video, and large amounts of data) are typically assigned longer time slots than are control information packets (e.g., acknowledgment messages, registration messages, synchronization messages, channel assignment messages, signal quality information, and so forth).

Upon being powered on, the processor 301 of each wireless device 103–107 instructs its applicable receiver 305 to scan a list of wireless carrier frequencies 109–111 that has been pre-programmed into the device's program memory 309 to detect the presence of broadcast control messages in a forward time slot 401 on one of the frequencies (e.g., frequency 109). The forward time slot 401 or group of forward time slots 401 containing such broadcast control messages is referred to herein as a broadcast control channel. Although depicted as residing on carrier frequency 109, the broadcast control channel may reside on any of the wireless carrier frequencies 109–111.

The broadcast control channel 401 preferably includes synchronization information to enable the processor 301 of each wireless device 103–107 to acquire time synchronization with the controller 201 of the wireless BTS system 101, as is necessary in TDMA systems. After acquiring time synchronization, the wireless device 103–107 registers with the wireless BTS system 101 by transmitting a registration message to the wireless BTS system 101 over a reverse time slot 402 assigned to the wireless carrier frequency 109 containing the detected broadcast control channel 401. In accordance with known techniques, the program memory 209 of each wireless device 103–107 includes appropriate information to enable the wireless device processor 301 to determine the location of the reverse time slot 402 for transmission of control information. In the preferred embodiment, the reverse time slots 402, 404, 406 are randomly accessed by the wireless device processors 301 in accordance with known techniques for purposes of communicating control information to the wireless BTS system controller 201.

After registering with the wireless BTS system 101, each wireless device processor 301 determines signal quality levels for some or all of the wireless channels in the network 100 in an effort to assist the wireless BTS system controller 201 in selecting one or more secondary or rescue channels for use in retransmitting certain information in accordance with the present invention. The wireless devices 103–107 preferably scan each carrier frequency 109–111 and measure the received signal strength or other indication of channel quality (e.g., carrier-to-interference plus noise ratio) of the scanned carrier frequency 109–111 during one or more time slots. Alternatively, the wireless BTS system 101 may instruct the wireless devices 103–107 to measure the signal quality levels of only certain channels, such as those intended for use as temporary rescue channels. In such an alternative embodiment, the wireless BTS system 101 would inform the wireless devices 103–107 of the list of channels to measure through transmissions over the broadcast control channel 401. In the event that the wireless device 103–107 does not have time upon start up to immediately perform the channel scan and signal quality determination due, for example, to the need to receive real-time or data information (e.g., when the wireless device 104 is a television that, immediately after synchronization and registration, begins receiving audio and video information), such device 103–107 may perform the signal quality determination during time slots that are not assigned to the device 103–107 for receiving real-time or data information. Once the wireless device 103–107 has determined the signal quality information for all or some of the wireless communication channels as applicable, the wireless device 103–107 transmits the signal quality information to the wireless BTS system controller 201 for processing.

While the wireless devices 103–107 are determining and reporting communication channel signal quality levels from their perspective, the wireless BTS system controller 201 likewise determines the signal quality levels of some or all of the wireless communication channels from its perspective by instructing the wireless BTS system receiver 205 to scan the applicable wireless carrier frequencies 109–111 and then measuring the received signal strength or some other signal quality metric of each scanned frequency 109–111 during one or more time slots. Upon determining its own signal quality levels for the wireless communication channels and receiving the signal quality levels from the wireless devices 103–107, the system controller 201 selects one or a group of wireless communication channels as secondary or rescue channels for use in retransmitting unsuccessfully received traffic information. For example, a single rescue channel may be selected for communications with all the wireless devices 103–107 or more than one rescue channel may be selected to support communications with the devices 103–107 depending on the collective signal quality information and the number of available channels. The list of selected rescue channels is then stored in the program memory 209 or another memory area for subsequent use. The list is also transmitted to the wireless devices 103–107 over the broadcast control channel 401. Thus, as described above, the wireless BTS system 101 and the wireless devices 103–107 work together to select one or a group of secondary rescue channels for use in retransmitting information packets preferably prior to initiating transmissions of information packets to the wireless devices 103–107.

One of ordinary skill in the art will appreciate that the various wireless devices 103–107 may be turned on and off at different times. In such cases, the wireless BTS system controller 201 and the wireless device processors 301 are preferably programmed to select a rescue channel for use by the particular wireless device 103–107 before any real-time information (i.e., information most affected by a degradation in quality of service) is transmitted from the wireless BTS system 101 to the particular wireless device 103–107. The wireless BTS system controller 201 preferably selects the rescue channel as described above based on the signal quality information already obtained and any new signal quality information transmitted by the recently powered-up device 103–107.

In the preferred embodiment, the wireless communication network 100 is capable of supporting various types of information, including audio, video and data. Consequently, the wireless BTS system controller 201 preferably allocates the wireless communication channels to support particular types of information. For example, the wireless BTS system controller 201 may allocate some of the wireless channels to support the transmission of non-real-time information, such as packetized data, while other wireless channels are allocated to support the transmission of real-time information, such as audio and/or video. In such a case, the wireless BTS system controller 201 preferably selects the rescue channels from the group of channels allocated to support the transmission of non-real-time information. Since the transmission of non-real-time-information packets may be interrupted temporarily without noticeable quality of service degradation, wireless channels that primarily support the transmission of non-real-time-information packets are optimal candidates for secondary use as rescue channels. Also, by preferably selecting a packet data channel or other channel used primarily to support the transmission of non-real-time-information packets as the rescue channel, a dedicated rescue channel need not be maintained, thereby increasing the bandwidth and spectral efficiency of the wireless communication network 100.

Having selected a rescue channel (or rescue channels, as the case may be) and associated the rescue channel with a wireless device 103–107, the wireless BTS system 101 begins processing incoming information intended for the wireless device 103–107. Except as otherwise noted herein, the remainder of the description of the operation of the wireless communication network 100 shall be provided based on the wireless BTS system's receipt of real-time information intended for wireless device 104. All the operations of the BTS system controller 201 and the wireless device processor 301 relating to the present invention are performed in accordance with operating instructions stored in the applicable program memory 209, 309 and executed by the BTS system controller 201 and the wireless device processor 301, as the case may be.

An interface 213 of the wireless BTS system 101 receives a sequence of information intended for the wireless device 104 from one of the information sources (e.g., from the CTS provider). The interface 213 passes the information along to the BTS system controller 201. The BTS system controller 201 divides the received sequence of information into information packets and processes the information for transmission over a wireless communication channel. The BTS system controller 201 also allocates a wireless communication channel to support the transmission of information packets to the wireless device 104. For example, in the preferred TDMA/TDD embodiment, the BTS system controller 201 might allocate one time slot 403 per time frame 412–414 for transmission of the information packets. The BTS system controller 201 generates a channel assignment message and instructs the transmitter 303 to transmit the message to the wireless device 104 in a forward time slot 401 of the broadcast control channel. Upon receiving the channel assignment, the wireless device 104 acknowledges the assignment over the reverse or return time slot 402 of the control channel.

After receiving the channel assignment acknowledgment, the BTS system controller 201 transmits one of the generated information packets to the wireless device 104 over the allocated wireless communication channel (e.g., time slot 403 in each time frame 412–414 over wireless carrier frequency 110). In addition, the BTS system controller 201 stores the transmitted information in the buffer memory 211 for retransmission purposes, if necessary, as described below.

Upon receipt of the information packet at the wireless device 104 and appropriate demodulating, decoding and other processing by the wireless device receiver 305, the wireless device processor 301 determines whether the received information packet was received successfully. In the preferred embodiment, the wireless device processor 301 determines bit error rate in accordance with known techniques (e.g., by computing a cyclic redundancy check (CRC) or frame check sequence (FCS) and comparing it to the CRC or FCS embedded in the information packet). In the event that the information packet was received successfully (e.g., with no bit errors or with a quantity of bit errors low enough to permit successful recovery of the transmitted information), the wireless device processor 301 generates a positive acknowledgment message (ACK) and instructs the wireless device transmitter 303 to transmit the ACK to the wireless BTS system 101 in the reverse time slot 404 of the allocated wireless communication channel. In the event that the information packet was received unsuccessfully (e.g., with too many bit errors to permit successful recovery of the transmitted information), the wireless device processor 301 generates a negative acknowledgment message (NACK) and instructs the wireless device transmitter 303 to transmit the NACK to the wireless BTS system 101 in the reverse time slot 404 of the allocated wireless communication channel. In an alternative embodiment, unsuccessful receipt of the information packet may be indicated simply by not sending a NACK or anything else back to the wireless BTS system 101 instead of positively sending a NACK. In such a case, the operating instructions executed by the wireless BTS system controller 201 would cause the BTS system controller 201 to determine that the information packet was not successfully received in the event that the BTS system controller 201 did not receive a positive acknowledgment message (ACK) within the reverse time slot 404.

After transmitting the information packet to the wireless device 104, the BTS system controller 201 determines whether or not the wireless device 104 successfully received the information packet. As used herein, "successfully received" refers to the receipt of an information packet that is in such a state or condition that the information contained in the information packet can be substantially recovered by the wireless device 103–107 that received the packet. In a preferred embodiment, the successful or unsuccessful receipt of the transmitted information packet is determined by the presence of an ACK or a NACK, respectively, in the reverse time slot 404 of the allocated TDD communication channel. Alternatively, as described above, the absence of an ACK or a NACK in the reverse time slot 404 of the allocated TDD communication channel may be used to determine that the information packet was not successfully received by the wireless device 104.

If the BTS system controller 201 determines that the information packet was received successfully by the wireless device 104 (e.g., due to the presence of an ACK in the reverse time slot 404), the BTS system controller 201 deletes the information packet from the buffer memory 211, stores the next information packet in the buffer memory 211, and transmits the newly stored information packet in the assigned time slot 403 of the next time frame 413 in accordance with the communication channel allocation established by the BTS system controller 201. If, on the other hand, the BTS system controller 201 determines that the information packet was not received successfully by the wireless device 104 (e.g., due to the presence of a NACK in the reverse time slot 404), the BTS system controller 201 retrieves the information packet from the buffer memory 211 and instructs the BTS system transmitter 203 to retransmit the information packet to the wireless device 104 over a wireless rescue channel.

In the preferred embodiment, the rescue channel is a TDD communication channel (forward time slot 405 and reverse time slot 406 in each time frame 412–414) operating on a wireless carrier frequency 111 that is different than the wireless carrier frequency 110 supporting the primary wireless communication channel. The selection of different wireless carrier frequencies 110, 111 for the primary communication channel and the secondary rescue channel reduces the likelihood that the rescue channel is subject to the same type and magnitude of interference that resulted in failure of the information packet to be received successfully over the primary channel in the first place. While the rescue channel is preferably supported by a different wireless carrier frequency 111, the rescue channel may alternatively comprise a TDD or TDMA channel on the same wireless carrier frequency 110 as the primary channel. In this case, the rescue channel is preferably a different time slot or set of time slots 405, 406 on the same wireless carrier frequency 110 that is supporting the primary channel. In the event that the rescue channel is a packet data channel or other channel primarily used for the transmission of non-real-time information packets, the BTS system controller 201 temporarily interrupts the transmission of the non-real-time information packets, if necessary, in order to facilitate retransmission of the missed information packet over the rescue channel.

In addition to instructing the BTS system transmitter 203 to retransmit the previously stored information packet over the rescue channel, the BTS system controller 201 instructs the BTS system transmitter 203 to transmit the next information packet of the information sequence over the primary channel. As described above, the wireless communication network 100 preferably supports the transmission of real-time information. As also noted above, excessive transmission delays of real-time information are readily apparent to wireless device users, resulting in poor perceived quality of service. In order to mitigate transmission delays associated with insuring reliable transmissions of real-time information packets, the BTS system controller 201 continues the transmission of the information packets in parallel with any retransmissions of missed or unsuccessfully received information packets. In the preferred TDMA embodiment, the retransmitted information packet is transmitted in the same time frame as the next information packet of the information sequence. As illustrated in FIG. 4, the retransmitted information packet is transmitted on wireless carrier frequency 111 in time slot 405 of time frame 413; whereas, the next new information packet is transmitted on wireless carrier frequency 110 in time slot 403 of the same time frame 413. Thus, in order to mitigate transmission delays of real-time information, while providing a reliable transmission protocol, the BTS system controller 201 transmits new information packets substantially contemporaneous with (e.g., within the same time frame as) the retransmission of unsuccessfully received information packets.

The BTS system controller 201 also stores the newly transmitted information packet in the buffer memory 211. The information packets preferably remain in the buffer memory 211 until deleted by the BTS system controller 201 upon receipt of acknowledgments from the wireless device 104 that the wireless device 104 has successfully received the packets. Alternatively, each information packet may be stored in the buffer memory 211 for no longer than a predetermined period of time equivalent to a predetermined number of time frames (e.g., three time frames), even if an ACK is never received for the particular packet, in order to provide efficient memory utilization of the buffer memory 211. The predetermined time for storage of an information packet in the buffer memory 211 may be varied based on the information packet's communication type. For example, data packets may be stored longer than audio or video packets.

After transmitting its ACK, NACK or nothing, as applicable, in response to receipt of an information packet, the wireless device 104 awaits receipt of another information packet. If the wireless device 104 transmitted a NACK or nothing to indicate that the prior packet was not successfully received, the wireless device processor 301 instructs the receiver to receive incoming signals on both the primary channel and the rescue channel(s). As discussed above, the rescue channel(s) is selected by the BTS system controller 201 based on signal quality information and communicated to the wireless device 104 prior to commencing transmission of information packets to the wireless device 104. Thus, the wireless device processor 301 knows which channel(s) to monitor for retransmitted information packets. As described in more detail below, the rescue channel is occasionally re-selected by the BTS system controller 201 based on signal quality information to insure that the rescue channel is a high quality channel in the event that its use becomes necessary.

Upon receipt of an information packet over the rescue channel or the primary channel, the wireless device processor 301 determines whether the packet was received successfully and preferably transmits an ACK or NACK to the wireless BTS system 101 over the reverse time slot of the applicable TDD channel (e.g., time slot 404 of time frame 413 on wireless carrier frequency 110 for an information packet received over the primary channel and time slot 406 of time frame 413 on wireless carrier frequency 111 for an information packet received over the rescue channel) or another assigned reverse communication channel. In the preferred embodiment, the protocol between the wireless device processor 301 and the other applicable audio/video/ data circuitry of the wireless device 104 is such that the wireless device processor 301 can store information packets in the buffer memory 311 for a predetermined time period equivalent to a predetermined number of time frames (e.g., three time frames) before such information is needed by the applicable circuitry. If an information packet was previously received unsuccessfully (e.g., with an uncorrectable number of errors), the wireless device processor 301 stores the information packet in the buffer memory 311 until successful receipt of the same information packet or expiration of the predetermined period of time.

Each information packet preferably includes a packet header that contains, inter alia, a wireless device identifier and a sequence identifier generated by the BTS system controller 201 in accordance with known techniques. The wireless device identifier identifies the wireless device 104 for which the information packet is intended. The sequence identifier indicates the sequence number of the information packet in the information sequence. Therefore, if an information packet with sequence number ten (10) is corrupted, the wireless device processor 30 stores the corrupted packet in the buffer memory 311 until an information packet with sequence number ten (10) is received successfully over the rescue channel or the time period for retaining packet number ten expires.

Upon receiving another information packet either over the primary channel or over the rescue channel, the wireless device 104 determines whether the packet was received successfully and transmits an applicable ACK, NACK or nothing in the reverse time slot 404, 406 of the corresponding wireless communication channel. In addition, the wireless device processor 301 stores the received packet in the buffer memory 311 to allow the wireless device processor 301 to arrange and retrieve the received packets in the proper order to reconstruct the sequence of information. If the received packet was received over the rescue channel and is received successfully, the wireless device processor 301 preferably replaces the stored, corrupted packet with the received packet having an identical sequence number to form the corrected packet for further processing.

Alternatively, if the packet received over the rescue channel is also corrupted, the wireless device processor 301 might selectively combine the stored, corrupted packet with the newly received packet in accordance with known techniques to produce the corrected packet for further processing. For example, the wireless device processor 301 might measure and store signal qualities for each symbol contained in the originally received, corrupted packet. The wireless device processor 301 would also measure the signal qualities for each symbol in the packet received over the rescue channel. The wireless processor could then first compare the symbols of the two packets for similarities and differences. When a symbol in the stored, corrupted packet is substantially identical to the same symbol in the retransmitted packet, the wireless device processor 301 could assume that the symbol is correct and include such symbol in the corrected packet. When a symbol in the stored, corrupted packet is different than the same symbol in the retransmitted packet, the wireless device processor 301 could then compare the signal qualities of the two received symbols and select the symbol with the better signal quality for inclusion in the corrected packet.

The corrected information packet is then retrieved from the buffer memory 311 at the applicable time and processed by the wireless device processor 301 to reconstruct the information sequence or the applicable portion thereof. The reconstructed sequence is then supplied to the applicable audio/video/data circuitry of the wireless device 104 for further processing as applicable.

If the most recent information packet received over the primary channel is received successfully (e.g., the packet received in time slot 403 of time frame 413), then the wireless device processor 301 so informs the wireless BTS system controller 201 (e.g., through transmission of an ACK in time slot 404 of time frame 413) and the BTS system controller 201 continues transmitting the next information packet, if necessary, over the primary wireless channel (e.g., in time slot 403 of the next time frame 414). Thus, the present invention provides a wireless rescue channel for use on a temporary, intermittent basis to provide a high quality transmission path in the event that the primary transmission path is corrupted for some reason, such as due to the presence of co-channel or adjacent channel interference from neighboring communication networks.

In the preferred embodiment, wireless carrier frequencies 109–111 are frequencies in the unlicensed frequency spectrum currently being targeted for use in wireless home networks (e.g., 5 GHz frequency range). Consequently, each frequency 109–111 has the possibility of encountering substantial, unpredictable interference due to the presence of similar neighboring networks (e.g., in apartment buildings, condominiums, and town homes) operating on common frequencies. Therefore, the wireless BTS system controller 201 and the wireless device processors 301 preferably determine the signal quality levels of the current rescue channel(s) and other candidate rescue channels (e.g., channels primarily supporting packet data communications or other non-real-time information transmissions) on a regular basis in order to permit the BTS system controller 201 to continuously maintain a rescue channel that has an overall expected signal quality that meets a predetermined criteria (e.g., meets or exceeds a network-dependent signal quality level).

For example, the wireless device processors 301 and the BTS system controller 201 may periodically (e.g., during an unused time slot of each frame if such an unused time slot exists) measure the signal quality levels of the current rescue channel and other candidate rescue channels and report such levels back to the BTS system controller 201. The BTS system controller 201 then computes overall signal quality levels for the current and candidate rescue channels based on such signal quality information (e.g., as the lowest signal quality levels measured by the BTS system controller 201 or reported by the wireless devices 103–107, as an average of the reported signal quality levels, or in some other manner) and determines signal quality trends or expectations for the channels. For example, if the signal quality levels are degrading or improving, the BTS system controller can detect such degradation or improvement over time based on the measured and reported signal quality levels.

Using the determined overall signal quality levels, the BTS system controller 201 regularly determines which channel should be the current rescue channel. If the channel presently assigned as the rescue channel does not have the best overall signal quality level of all the candidate rescue channels, the BTS system controller 201 preferably selects the highest quality candidate as the rescue channel and transmits this new rescue channel allocation to the wireless device 104 or devices 103–107, as applicable, over the broadcast control channel. Thus, in the preferred embodiment, the BTS system 101 and the wireless devices 103–107 regularly measure and report rescue channel signal quality, and the BTS system controller 201 re-allocates or reassigns the rescue channel as necessary to maintain a high quality channel as the rescue channel.

In the event that the current rescue channel is being used primarily to support transmission of non-real-time information (e.g., packet data) to one or more of the wireless devices 103–107 and only secondarily as a rescue channel, the BTS system controller 201 preferably temporarily and regularly (e.g., periodically) interrupts packet transmissions on the channel to permit the wireless devices 103–107 and the BTS system controller 201 to measure the signal quality levels (e.g., levels of interference) of the channel. The timing of such interruptions is preferably scheduled by the BTS system controller 201 through transmissions of a rescue channel bit or other indicia over the broadcast control channel. The interrupt periods are preferably scheduled periodically or pseudo-randomly to substantially reduce the likelihood that neighboring wireless networks (e.g., other wireless home networks or LANs) will simultaneously interrupt interfering transmissions, thereby possibly causing inaccurate signal quality level determinations.

The wireless devices 103–107, after determining rescue channel signal quality during each scheduled interrupt period, transmit their signal quality determinations to the BTS system controller 201 over the reverse control channel (e.g., in reverse control time slots 404, 406). The BTS system controller 201 then computes an overall signal quality level based on the signal quality information received from the wireless devices 103–107 and its own signal quality levels that were determined during the interrupt period. If the current rescue channel has acceptable signal quality (e.g., measured and reported interference levels are below a threshold), the BTS system controller 201 maintains the allocation of the current rescue channel. If the current rescue channel has unacceptable signal quality, the BTS system controller 201 selects another rescue channel having acceptable, or at least better, signal quality and the prior rescue channel is reassigned to its pre-rescue channel function (e.g., use as a packet data channel). In an alternative embodiment, if another candidate rescue channel has better signal quality than the current rescue channel (even if the current rescue channel has acceptable signal quality), the BTS system controller 201 might select the candidate rescue channel with the better signal quality as the new rescue channel and transmit the identification of the new rescue channel to the wireless devices 103–107 over the broadcast control channel.

In addition to regularly measuring the signal quality of the rescue channel and other candidate rescue channels, each wireless device processor 301 also preferably determines the signal quality of its primary channel (i.e., the channel assigned for primary transmission of information packets to the particular wireless device 103–107) and reports the determined signal quality levels back to the BTS system controller 201. If the BTS system controller 201 determines that the signal quality of the primary channel has degraded to an unacceptable level or has remained below an acceptable level for a predetermined period of time (e.g., the average signal quality is below an acceptable level), the BTS system controller 201 selects a new primary channel with a better signal quality (as determined based on measured and reported signal quality levels), which new channel may be the current rescue channel, and informs the applicable wireless device 103–107 over the broadcast control channel in accordance with known primary channel handoff techniques. If the current rescue channel is selected as the new primary channel, the BTS system controller 201 selects a new rescue channel from the list of rescue channel candidates based on the measured and reported signal quality levels of such candidate rescue channels.

As described above, the present invention provides a wireless communication network that includes one or more rescue channels to facilitate the retransmission of unsuccessfully received information packets, while minimizing the delays in transmitting subsequent information packets that are typically encountered when employing conventional retransmission schemes. The present invention is particularly, although not solely, applicable for use in wireless home networks, wireless LANs or other wireless networks that are subject to intermittently high levels of interference and/or utilize unlicensed frequency spectrum for communicating real-time information or other information that requires a high quality of service. Through use of the present invention, wireless devices can receive real-time information reliably, without substantial delays that could result in unacceptable quality of service.

Figure 5:
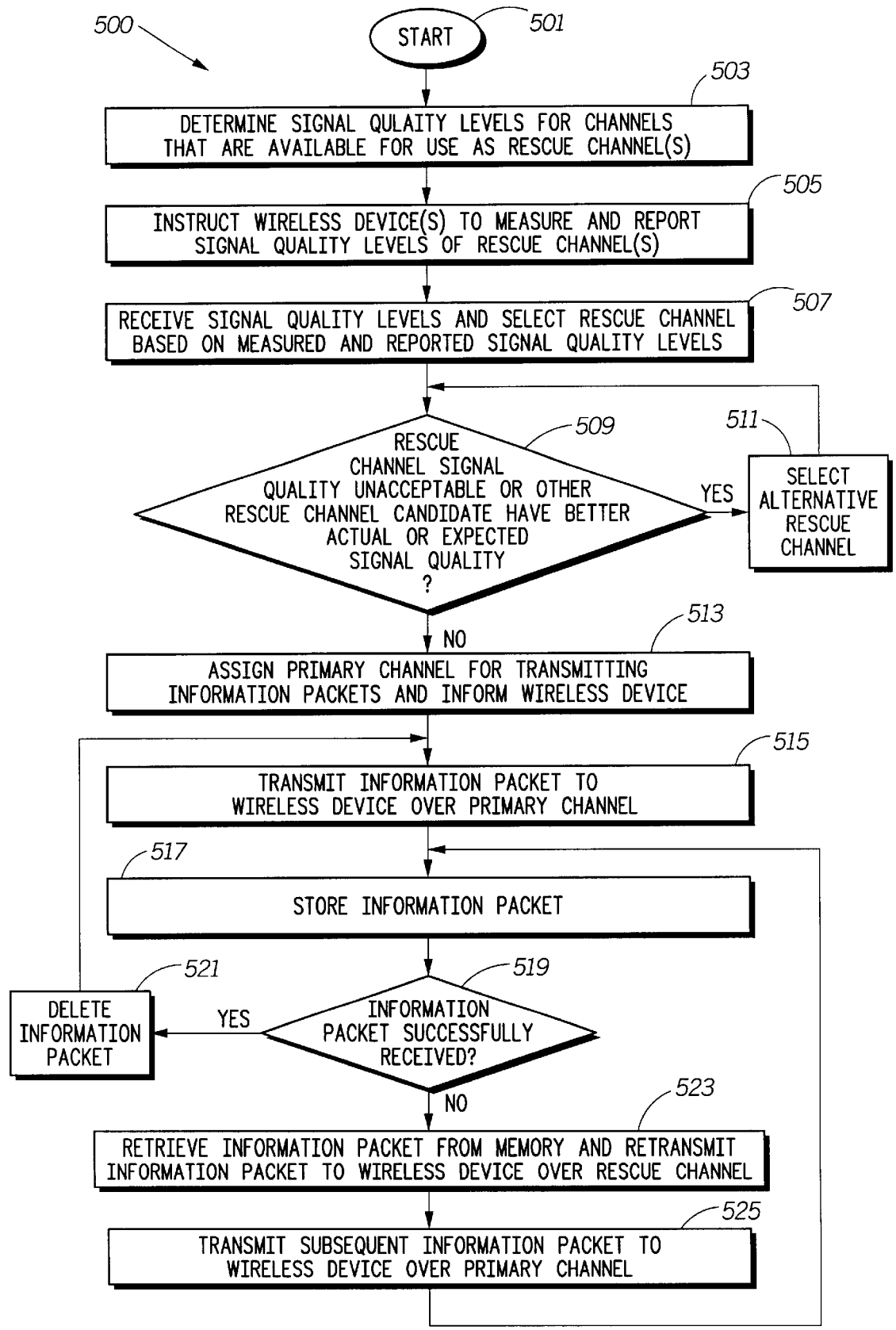
FIG. 5 is a logic flow diagram of steps executed by a wireless BTS system or other system control device in accordance with one embodiment of the present invention.

FIG. 5 is a logic flow diagram of steps executed by a wireless BTS system or other system control device in accordance with one embodiment of the present invention. The logic flow begins (501) when the system control device allocates a rescue channel for use in transmitting information packets that have not been successfully received by one or more of the other wireless devices in the network. In order to allocate the rescue channel, the system control device determines (503) respective signal quality levels for channels that are available for use as rescue channels. Such channels may be channels dedicated for use as rescue channels or channels assigned primarily for other uses, such as for supporting the transmission of non-real-time information packets (e.g., packet data), and only secondarily functioning as rescue channels.

In addition to measuring its own signal quality levels, the system control device instructs (505) the other wireless devices in the network to also measure the signal quality levels of all candidate rescue channels (e.g., as identified by channel identifiers transmitted along with a measurement instruction communicated over a broadcast control channel) and report such signal quality information to the system control device over a reverse control channel. In the preferred embodiment, the wireless network utilizes time division duplex channels; thus, the broadcast control channel and the reverse control channel are different sets of time slots in each time division multiplexed time frame as illustrated in FIG. 4. The signal quality levels are preferably received signal strength indication (RSSI) measurements indicating the levels of interference present on the measured channels, although other conventional signal quality metrics may be used.

After the system control device receives (507) the signal quality information from the wireless devices, the control device selects (507) the rescue channel based on its own measured signal quality levels and the signal quality levels reported by the other wireless devices. For example, the system control device may select the rescue channel as the candidate rescue channel that exhibits the best downlink signal quality (as measured by the wireless devices other than the system control device) and the best uplink signal quality (as measured by the system control device). If such a candidate rescue channel does not exist, then a weighting may be applied to the signal quality measurements to determine the selected rescue channel (e.g., the downlink signal quality measurements may be given a higher weighting than the uplink measurements). In addition, the rescue channel is preferably selected to have a carrier frequency that is different than the carrier frequencies of the primary channels used to convey real-time information in order to reduce the likelihood that the rescue channel is being subject to the same levels and type of interference as those that resulted in corruption of a transmitted packet to the extent that a retransmission was required.

After the rescue channel is selected, the identity of the rescue channel is transmitted over the broadcast control channel. The selection of the rescue channel preferably occurs before any information packets (or at least any real-time information packets) are conveyed to the wireless devices in order to establish a channel arrangement that facilitates reliable communications with minimal delay. Once the original rescue channel is selected, the rescue channel identification may be periodically transmitted to the wireless devices over the broadcast control channel to insure that each wireless device, as it is powered up and registers in the system, is informed of which channel to switch to for retransmissions of corrupted information packets.

Alternatively and more preferably, the rescue channel may be selected on a communication-by-communication basis just prior to assignment of a primary channel for transmission of information packets to a target wireless device. That is, when information is received by the system control device that is intended for one of the target devices, the system control device retrieves previously stored signal quality information for the candidate rescue channels and then selects the best rescue channel based on the stored data. The system control device then communicates the selection of the rescue channel to the target device at substantially the same time as the system control device informs the target device of the primary channel assignment. Such an embodiment provides greater flexibility for proper selection of the rescue channel on a just-in-time basis, increasing the likelihood that the rescue channel selected for a particular communication will be the best one available.

After the rescue channel is originally established, the system control device performs regular (e.g., periodic or as often as reasonable given the particular loading of the network) determinations (509) of the signal qualities of the current rescue channel and of the other candidate rescue channels in an attempt to maintain, on a substantially continuous basis, the highest quality rescue channel for use in retransmitting unsuccessfully received information packets. To effectuate these determinations, the system control device regularly measures the uplink signal qualities of the current rescue channel and the other candidate rescue channels (e.g., channels being utilized primarily for the transmission of non-real-time information) and regularly instructs the other wireless devices in the network (or at least those devices that are targets for the transmission of real-time information) to measure the downlink signal qualities of such channels. In the preferred TDMA network embodiment, the system control device and the other wireless devices measure the current rescue channel and the other candidate rescue channels during time slots that are not being used by the particular devices to transmit or received information packets. In the event that one or more of the rescue channel or other candidate rescue channels are primarily used to support the transmission of packet data or other non-real-time information, the transmissions on such channels are temporarily interrupted on a regular basis to enable the wireless devices to perform interference level and other signal quality measurements.

If, based on the regularly measured uplink signal quality and the regularly reported downlink signal quality, the system control device determines (509) that the current rescue channel has an unacceptable signal quality (e.g., interference levels that exceed a threshold) or that the actual or expected signal quality level of another candidate rescue channel is better or more favorable than the actual or expected signal quality of the current rescue channel, the system control device selects (511) the higher quality rescue channel as the new rescue channel and informs the wireless devices, through a broadcast control channel message, of the new rescue channel selection. Thus, in the preferred embodiment, the system control device is regularly monitoring the quality level of the rescue channel to substantially increase the likelihood that retransmissions, if they need to occur, are communicated on a high quality channel. Since the current rescue channel and the other rescue channel candidates are monitored on a regular basis, the system control device receives sufficient data to compute signal quality trends for the rescue channel and the rescue channel candidates. From these trends, the system control device can determine (e.g., using conventional extrapolation and statistical techniques) expected signal qualities for the rescue channel and the other rescue channel candidates. As noted above, the system control device may be programmed to select or re-select the rescue channel based on the expected or projected signal qualities of the current rescue channel and the other rescue channel candidates.

While steps 509 and 511 are depicted in FIG. 5 as occurring prior to assignment of a primary channel for transmitting information packets to a wireless device, one of ordinary skill in the art will readily recognize that such steps are preferably performed repeatedly throughout the operation of the network in order to maintain the selection of high quality rescue channels, and the particular location of steps 509 and 511 in FIG. 5 should not be interpreted to limit the timing of the performance of such steps in any way. Notwithstanding the foregoing, as noted above, the rescue channel is preferably originally established prior to the transmission of any real-time information packets to a particular target wireless device.

After a rescue channel has been selected and the system control device receives information from an information source, such as a cable service provider or other information service provider, the system control device assigns (513) a primary or traffic channel for use in transmitting the information, preferably in the form of information packets, to the target wireless device, and informs (513) the target device of the primary channel assignment over the broadcast or some other control channel. In the preferred embodiment, the assigned primary channel comprises a TDD channel containing one or more time slots per time frame for transmitting the information packets to the target device and one time slot per time frame to enable the target device to acknowledge, positively or negatively, successful receipt of the transmitted packet. The preferred rescue channel is also a similarly arranged TDD channel operating on a carrier frequency different than the carrier frequency of the primary channel to mitigate the likelihood of being exposed to common interference as noted above. Of course, one of ordinary skill in the art will readily recognize that other types of channels and multiple access techniques may be alternatively used for purposes of assigning and selecting both the primary channel and the rescue channel. For example, the rescue channel may be selected as a second time slot or set of time slots operating on the same carrier frequency as the primary channel, or the rescue channel may utilize a different multiple access scheme then the primary channel provided that the wireless device is capable of multi-mode operation.

Having assigned the primary channel and the rescue channel, and informed the target wireless device of such assignments, the system control device transmits (515) an information packet to the wireless device over the primary channel (e.g., in a time slot of a time frame in a TDMA network). The system control device also stores (517) the transmitted packet in memory in case retransmission is necessary. After transmitting and storing the information packet, the system control device determines (519) whether the transmitted packet was received successfully by the target device. This determination is preferably performed by detecting an ACK or a NACK in the acknowledgment or reverse time slot of the assigned primary TDD channel.

When the system control device determines (519) that the transmitted packet was received successfully, the system control device deletes (521) the stored packet from memory and transmits (515) the next packet to the target device over the assigned primary channel. However, when the system control device determines (519) that the transmitted packet was not received successfully, the system control device retrieves (523) the stored packet from memory and retransmits (523) the packet to the wireless device over the rescue channel. In addition, the system control device transmits (525) a subsequent information packet (e.g., the next or another applicable information packet of the information sequence) to the target wireless device over the primary channel. That is, the system control device preferably transmits a new information packet substantially contemporaneously with retransmission of the missed packet in order to minimize transmission delay. Minimization of transmission delay is particularly important when transmitting real-time information packets in order to maintain an expected quality of service. In the preferred embodiment, the missed information packet is transmitted in one time slot over the carrier frequency supporting the rescue channel during the same time frame that the new information packet is transmitted in a time slot over the carrier frequency supporting the primary channel. Thus, the retransmitted packet and the new packet are preferably received at the target device in the same TDMA time frame. The above rescue channel selection and retransmission procedures preferably continue throughout the duration of the information sequence transmission.

Figure 6:
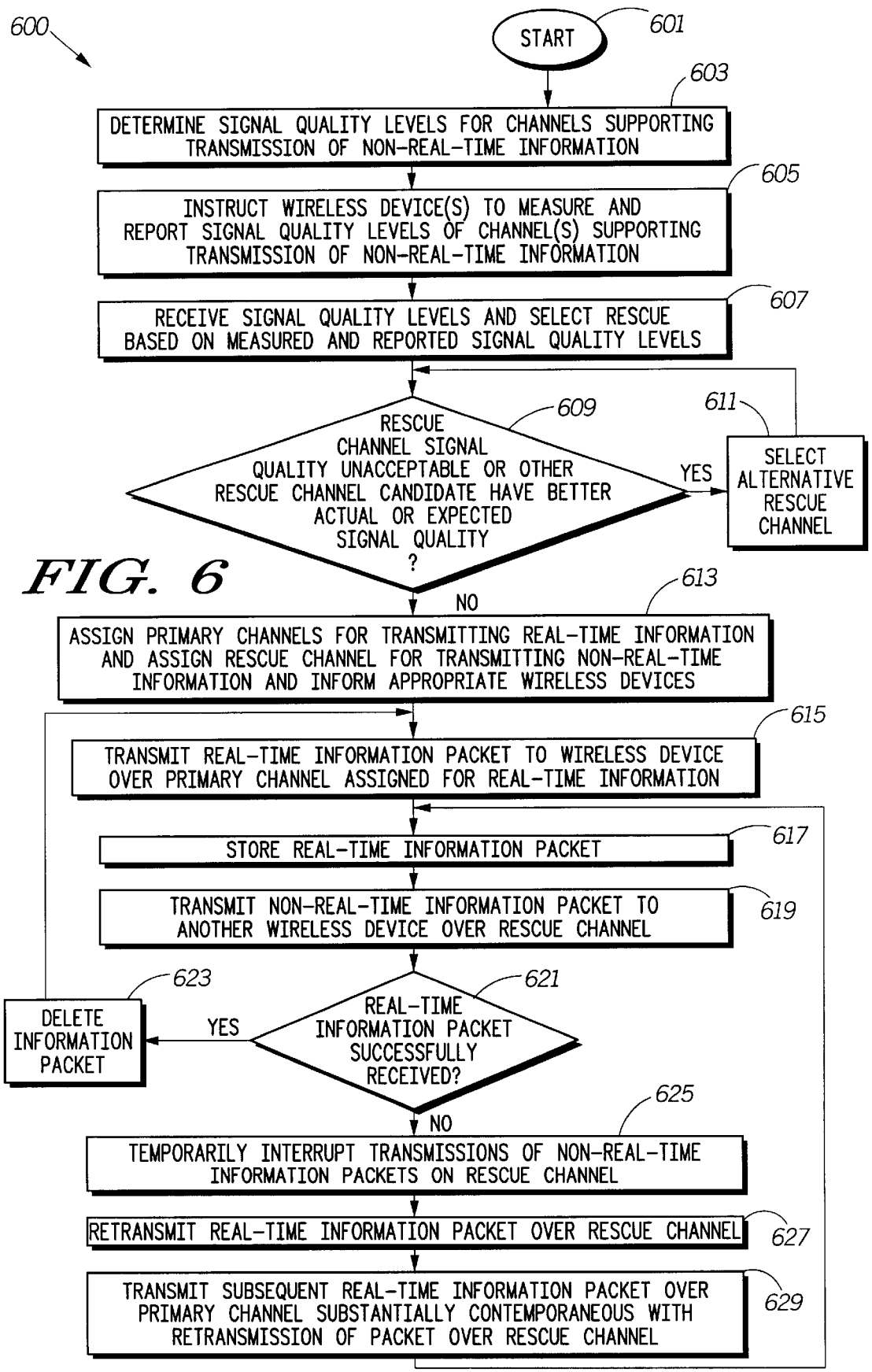
FIG. 6 is logic flow diagram of steps executed by a wireless BTS system or other system control device in accordance with another embodiment of the present invention.

FIG. 6 is a logic flow diagram 600 of steps executed by a wireless BTS system or other system control device in accordance with an alternative embodiment of the present invention. The logic flow begins (601) when the system control device establishes and maintains (603–611) a high quality rescue channel for use in retransmitting information packets that have not been successfully received by one or more of the other wireless devices in the network. The steps of the logic flow performed in blocks 603–611 are essentially the same as the steps described above with respect to blocks 503–511 of FIG. 5, except that, in this embodiment, the rescue channels are limited to being channels that primarily support the transmission of non-real-time information (e.g., packet data). As discussed above, in order to facilitate measurement of the signal quality levels of a rescue channel in this embodiment by the wireless devices, the system control device temporarily and regularly interrupts the transmission of non-real-time information over the rescue channel. Without such scheduled interruptions, measurement of interference levels present on the particular rescue channel could prove to be very difficult, if not impossible. During the interrupt periods, the wireless devices and the system control device determine the signal quality levels of the rescue channel. After making such determinations, the wireless devices transmit their respectively determined signal quality levels to the system control device. The received signal qualities are then used by the system control device, as discussed in detail above, to maintain selection of the current rescue channel, or to select a new rescue channel in the event that the one or more of the signal quality levels reported by the wireless devices or measured by the system control device indicates unacceptable signal quality of the current rescue channel.

After a rescue channel has been selected and the system control device receives real-time information intended for a target wireless device in the network from an information source, the system control device assigns (613) a primary channel for use in transmitting the information packets to the target wireless device, and informs (613) the target device of the primary channel assignment over the broadcast or some other control channel. The assigned primary channel and the selected rescue channel preferably comprise TDD channels operating in a TDMA system on different carrier frequencies to mitigate the likelihood of common interference being present on both channels.

In addition to assigning the primary channel for transmission of real-time information to one wireless device, the system control device also assigns (613) the rescue channel for primary use in transmitting non-real-time information to one or more other wireless devices. That is, in this embodiment, the rescue channel for purposes of transmitting real-time information doubles as a primary channel for transmitting non-real-time information in order to more efficiently utilize wireless resources, as compared to maintaining dedicated rescue channels. The assignment of the rescue channel as a primary non-real-time information channel is communicated to the applicable wireless devices (which devices may also include the device targeted to receive real-time information) over the broadcast or some other control channel.

Having assigned the primary channel and the rescue channel for purposes of transmitting real-time information, and informed the target wireless device of such assignments, the system control device transmits (615) an information packet to the wireless device over the primary channel. The system control device also stores (617) the transmitted packet in memory in case retransmission is necessary. As applicable, the system control device also transmits (619) non-real-time information packets to wireless devices over the rescue channel in accordance with the rescue channel's primary use as a packet data or other non-real-time information channel.

After transmitting and storing the real-time information packet, the system control device determines (621) whether the transmitted real-time information packet was received successfully by the target wireless device. This determination is preferably performed by detecting an ACK or a NACK in the acknowledgment or reverse time slot of the assigned primary TDD channel as discussed above.

When the system control device determines (621) that the transmitted packet was received successfully, the system control device deletes (623) the stored packet from memory and transmits (615) the next real-time information packet to the target device over the assigned primary channel. On the other hand, when the system control device determines (621) that the transmitted packet was not received successfully, the system control device temporarily interrupts (625) transmissions of non-real-time information packets over the rescue channel, retrieves the stored real-time information packet from memory, and retransmits (627) the retrieved packet to the wireless device over the rescue channel. In addition and substantially contemporaneous with retransmission of the retrieved information packet over the rescue channel, the system control device transmits (629) a subsequent real-time information packet (e.g., the next or another applicable information packet of the information sequence) to the target wireless device over the primary channel. As discussed above, substantially contemporaneous transmission of the next information packet over the primary channel is performed to minimize transmission delay and thereby maintain a quality of service typically expected of real-time information transmissions. In the preferred embodiment, the retransmitted information packet is transmitted in one time slot over the carrier frequency supporting the rescue channel during the same time frame that the new information packet is transmitted in a time slot over the carrier frequency supporting the primary channel. Thus, the retransmitted packet and the new packet are preferably received at the target device in the same TDMA time frame. After the rescue channel is no longer needed for retransmitting corrupted real-time information packets, the rescue channel reverts to a primary channel for transmitting non-real-time information. The above rescue channel selection and usage procedures preferably continue throughout the duration of the real-time information sequence transmission.

Figure 7:
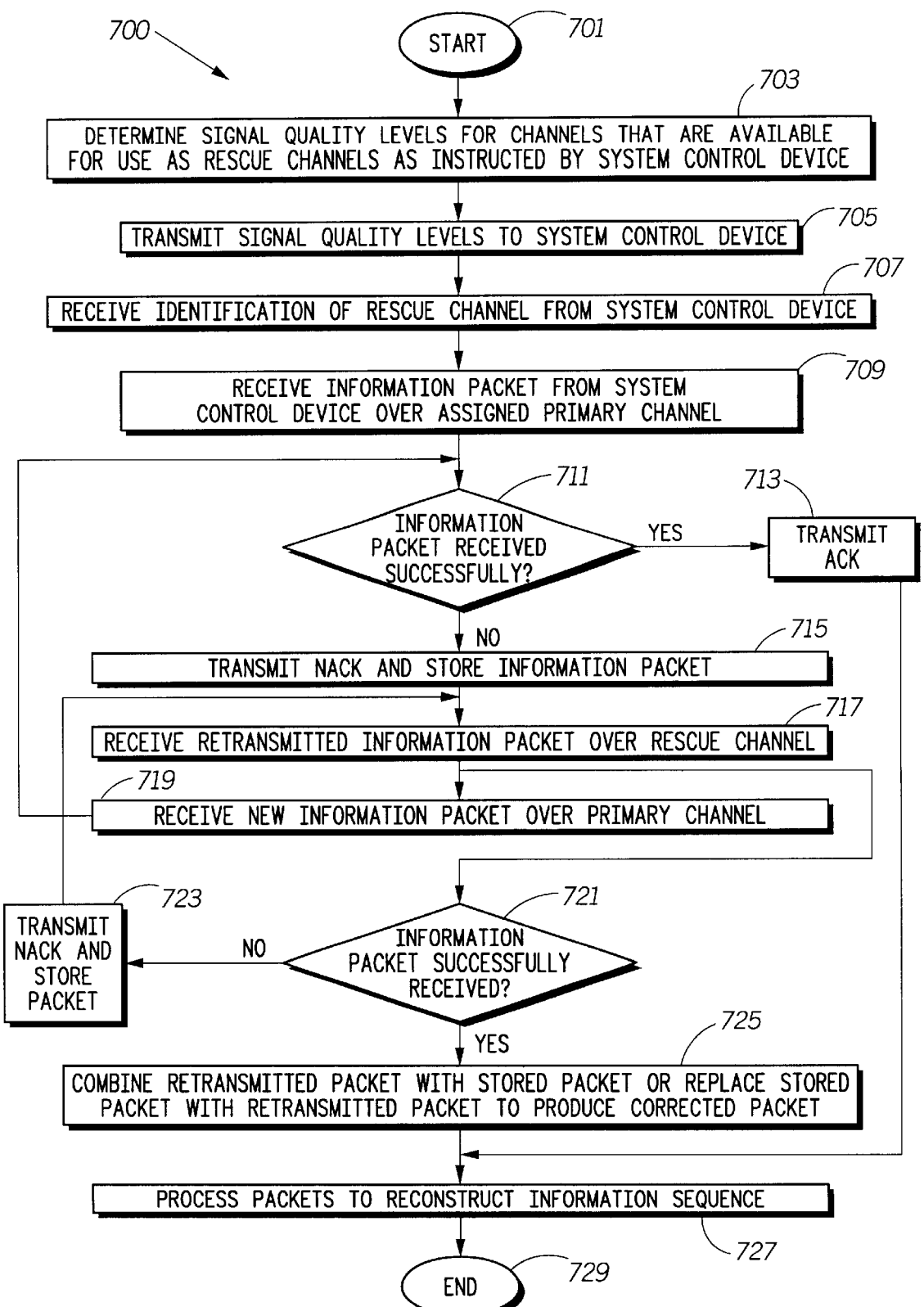
FIG. 7 is logic flow diagram of steps executed by a wireless electronic device in accordance with the present invention.

FIG. 7 is logic flow diagram 700 of steps executed by a wireless electronic device in accordance with the present invention. The logic flow begins (701) when the wireless device, after receiving identifications of available rescue channels from the system control device, determines (703) signal quality levels for such channels as instructed by the system control device, and transmits (705) the signal quality levels to the system control device over a control channel. Some time after transmitting the signal quality levels, the wireless device receives (707) the identifications of the currently selected rescue channel and the currently assigned primary channel for purposes of an upcoming set of information packet transmissions from the system control device.

At the appropriate time in accordance with the wireless protocol used in the network, the wireless device, through execution of stored programming instructions, accesses the assigned primary channel and receives (709) an information packet from the system control device. The wireless device then determines (711) whether the received packet was received successfully. In the preferred embodiment, such determination is made by measuring a bit or block error rate in accordance with known techniques to determine the recoverability of the information contained in the information packet. If the information packet was received successfully, the wireless device transmits (713) a positive acknowledgement message (ACK) back to the system control device to inform the system control device that the information packet was received successfully. If the information packet was not received successfully (e.g., the measured bit error rate exceeded a threshold), the wireless device transmits (715) a negative acknowledgment message (NACK) or otherwise informs the system control device (e.g., by not transmitting any acknowledgment message) that the transmitted information packet was not received successfully. In the preferred embodiment, the primary channel is a time division duplex channel and the wireless device transmits the ACK or the NACK in a reverse time slot of the same time frame that includes the forward time slot that contained the information packet. Thus, in the preferred embodiment, during each TDMA time frame, the system control device transmits an information packet to the wireless device and is informed by the wireless device as to whether or not the transmitted packet was received successfully. Whether the information packet is received successfully or not, the wireless device preferably stores the information packet in a buffer memory to allow proper sequential processing of the information packets.

In the event that the information packet was not received successfully, the wireless device receives (717) the retransmitted information packet over the rescue channel. In addition, when real-time information is being communicated, the wireless device also receives (719) a new information packet over the primary channel. Therefore, at least with respect to the transmission of real-time information packets, the retransmitted packet is transmitted substantially in parallel with a newly transmitted packet in order to minimize the delays typically associated with a reliable, retransmission protocol. In a preferred TDMA embodiment in which the rescue channel operates over one carrier frequency and the primary channel operates over another carrier frequency, the wireless device receives the retransmitted and newly transmitted information packets in different time slots of the same time frame to implement the substantially parallel communication of the retransmitted and newly transmitted information packets.

Upon receiving the retransmitted packet over the rescue channel, the wireless device determines (721) whether the retransmitted packet was received successfully. If the retransmitted packet was not received successfully, the wireless device transmits (723) a NACK back to the system control device and the logic flow continues at block 717. The wireless device might also store the corrupted, retransmitted information packet in the buffer memory (e.g., either replace the existing corrupted packet or selectively combine the corrupted, retransmitted packet with the corrupted original packet) if the wireless device is programmed to selectively combine retransmitted packets with originally, partially corrupted packets.

If the retransmitted information packet is received successfully, the wireless device, in accordance with its programming instructions, either combines (725) the retransmitted packet with the previously stored corrupted packet or replaces (725) the stored corrupted packet with the retransmitted packet to produce a corrected packet. The wireless device then processes (727) corrected packets and originally successfully received packets to reconstruct the sequence of information formed by the packets, and the logic flow ends (729). Each packet preferably includes a sequence identifier that enables the wireless device's processor to properly arrange the successfully received packets (whether originally transmitted or retransmitted) to form the original sequence of information. The logic flow depicted in FIG. 7 continues for the duration of each information sequence (which sequence may last for hours (e.g., until the wireless device is turned off) in the event that the information sequence is television programming or public radio transmissions).

As discussed above with respect to FIG. 5, the wireless device and the system control device determine the signal quality levels of the rescue channel on a regular basis. The wireless device transmits its determined signal quality level to the system control device for use in evaluating the condition of the currently selected rescue channel. If the system control device determines that, based on the signal quality levels reported by the wireless device or other wireless devices in the network and/or measured by the system control device, the current rescue channel has an unacceptable signal quality (e.g., measured or reported signal levels exceed a threshold) and needs to be changed, the wireless device receives a control channel message from the system control device indicating the identification of the newly selected rescue channel. As discussed in detail above, the newly selected rescue channel is chosen based on signal quality measurements of rescue channel candidates that were made by the wireless devices in the network and by the system control device.

The present invention encompasses a method and apparatus for reliably communicating information packets in a wireless communication network. With this invention, real-time information can be communicated reliably in a wireless network, while maintaining a quality of service typically expected by persons who are generally accustomed to using wired devices. In addition, by preferably utilizing a channel that is primarily used to transmit non-real-time information as a rescue channel for retransmitting corrupted real-time information packets, the present invention makes efficient use of wireless resources to provide the foregoing reliability and quality of service benefits. Further, through regular monitoring of the rescue channel by both the wireless electronic devices and the system control device, the present invention insures that the highest quality available rescue channel is maintained to support real-time information packet retransmissions, thereby increasing the likelihood that a only a single retransmission is necessary to overcome transmission of an unrecoverable packet.

In the foregoing specification, the present invention has been described with reference to specific embodiments. However, one of ordinary skill in the art will appreciate that various modifications and changes may be made without departing from the spirit and scope of the present invention as set forth in the appended claims. For example, the channel control functions performed by the BTS system controller 201 may be distributed among the wireless device processors 301 or be performed by a particular wireless device processor on a permanent or interim basis. Accordingly, the specification and drawings are to be regarded in an illustrative rather than a restrictive sense, and all such modifications are intended to be included within the scope of the present invention.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims. As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus.

What is claimed is:

1. A method for a first wireless device to reliably communicate information packets to a second wireless device in a wireless communication network, the method comprising the steps of:
    transmitting a first information packet to the second wireless device over a first wireless communication channel;
    determining whether the first information packet was successfully received by the second wireless device;
    retransmitting the first information packet to the second wireless device over a second wireless communication channel in the event that the first information packet was not successfully received by the second wireless device; and
    transmitting at least a second information packet to the second wireless device over the first wireless communication channel substantially contemporaneously with retransmitting the first information packet, wherein the first information packet and the at least a second information packet form a sequence of information.

2. The method of claim 1, further comprising the steps of:
    prior to the step of transmitting the first information packet,
    determining respective signal quality levels for a plurality of wireless communication channels that are available for use in the wireless communication network;
    receiving signal quality information for the plurality of wireless communication channels from the second wireless device; and
    selecting the second wireless communication channel from the plurality of wireless communication channels based on the signal quality levels and the received signal quality information.

3. The method of claim 1, further comprising the steps of:
    storing the first information packet in a memory of the first wireless device;
    retrieving the first information packet from the memory in the event that the first information packet is to be retransmitted; and
    deleting the first information packet from the memory in the event that the first information packet was determined to be successfully received by the second wireless device.

4. The method of claim 1, wherein the first wireless communication channel and the second wireless communication channel are two of a plurality of wireless communication channels available for use in the wireless communication network, the method further comprising the steps of:
    determining a signal quality level of the second wireless communication channel;
    receiving signal quality information relating to the second wireless communication channel from the second wireless device; and
    selecting a third wireless communication channel from the plurality of wireless communication channels for purposes of retransmitting unsuccessfully received information packets in the event that at least one of the signal quality level and the signal quality information indicates unacceptable signal quality of the second wireless communication channel.

5. The method of claim 4, wherein the steps of determining a signal quality level and receiving signal quality information are performed on a regular basis in order to permit a substantially continuous signal quality determination of the second wireless communication channel at least while the second wireless communication channel is being utilized for purposes of retransmitting unsuccessfully received information packets.

6. The method of claim 1, wherein the first wireless communication channel and the second wireless communication channel are two of a plurality of wireless communication channels available for use in the wireless communication network, the method further comprising the steps of:
    determining signal quality levels of the second wireless communication channel and of a third wireless communication channel;
    receiving signal quality information relating to the second wireless communication channel and the third wireless communication channel from the second wireless device;
    determining expected signal quality of the second wireless communication channel and of the third wireless communication channel based upon the signal quality levels and the signal quality information; and selecting the third wireless communication channel from the plurality of wireless communication channels for purposes of retransmitting unsuccessfully received information packets in the event that the expected signal quality of the third wireless communication channel Is more favorable than the expected signal quality of the second wireless communication channel.

7. The method of claim 1, wherein the wireless communication network employs a time division multiple access protocol in which information is communicated in time slots arranged into time frames, wherein the first wireless communication channel is at least one time slot on a first carrier frequency and wherein the second wireless communication channel is at least one time slot on a second carrier frequency.

8. The method of claim 7, wherein the step of transmitting the second information packet comprises the step of:

transmitting the second information packet in at least one time slot over the first carrier frequency during a time frame in which the first information packet is retransmitted in at least one time slot over the second carrier frequency.

9. The method of claim 1, wherein the wireless communication network employs a time division multiple access protocol in which information is communicated in time slots arranged into time frames, wherein the first wireless communication channel is at least one time slot on a first carrier frequency and wherein the second wireless communication channel is at least one other time slot on the first carrier frequency.

10. The method of claim 1, wherein the information packets include real-time information.

11. The method of claim 10, wherein the second wireless communication channel is used primarily in support of non-real-time information packet transmissions and secondarily for purposes of retransmitting unsuccessfully received, real-time information packets.

12. A method for a first wireless device to reliably communicate information packets to a second wireless device in a wireless local area network, the method comprising the steps of:

transmitting a first information packet to the second wireless device over a first wireless communication channel, the first information packet including real-time information;

transmitting packetized, non-real-time information to at least one of the second wireless device and a third wireless device over a second wireless communication channel;

determining whether the first information packet was successfully received by the second wireless device;

in the event that the first information packet was not successfully received by the second wireless device,
  temporarily interrupting transmission of the packetized, non-real-time information over the second wireless communication channel;
  retransmitting the first information packet to the second wireless device over the second wireless communication channel; and substantially contemporaneous with retransmission of the first information packet, transmitting a second information packet to the second wireless device over the first wireless communication channel, wherein the first information packet and the second information packet form a sequence of information.

13. The method of claim 12, wherein the first wireless communication channel and the second wireless communication channel are two of a plurality of wireless communication channels available for use in the wireless local area network, the method further comprising the steps of:

temporarily and regularly interrupting transmissions of the packetized, non-real-time information over the second wireless communication channel to produce interrupt periods;

determining signal quality levels of the second wireless communication channel during the interrupt periods;

receiving signal quality information relating to the second wireless communication channel from the second wireless device; and selecting a third wireless communication channel from the plurality of wireless communication channels for purposes of retransmitting unsuccessfully received information packets in the event that at least one of the signal quality levels and the signal quality information indicate unacceptable signal quality of the second wireless communication channel.

14. The method of claim 12, wherein the wireless local area network employs a time division multiple access protocol in which information is communicated in time slots arranged into time frames, wherein the first wireless communication channel is at least one time slot on a first carrier frequency, wherein the second wireless communication channel is at least one time slot on a second carrier frequency, and wherein the step of transmitting the second information packet substantially contemporaneous with retransmission of the first information packet comprises the step of:

transmitting the second information packet in at least one time slot over the first carrier frequency during a time frame in which the first information packet is retransmitted in at least one time slot over the second carrier frequency.

15. A method for a first wireless device to reliably receive information packets from a second wireless device in a wireless communication network, the method comprising the steps of:

receiving a first information packet from the second wireless device over a first wireless communication channel;

informing the second wireless device as to whether the first information packet was successfully received;

receiving the first information packet from the second wireless device over a second wireless communication channel in the event that the first information packet was not successfully received previously; and receiving at least a second information packet from the second wireless device over the first wireless communication channel substantially contemporaneously with receiving the first information packet over the second wireless communication channel, wherein the first information packet and the at least a second information packet form a sequence of information.

16. The method of claim 15, further comprising the steps of:

in the event that the first information packet was not originally received successfully on the first wireless communication channel, storing the first information packet in memory until receipt of the first information packet over the second wireless communication channel to produce a stored information packet;

combining the stored information packet with the first information packet received on the second wireless communication channel to produce a corrected information packet; and processing the corrected information packet and the at least a second information packet to reconstruct the sequence of information.

17. The method of claim 15, further comprising the steps of:

in the event that the first information packet was not originally received successfully on the first wireless communication channel, storing the first information packet in memory until receipt of the first information packet over the second wireless communication channel to produce a stored information packet;

replacing the stored information packet with the first information packet received over the second wireless communication channel to produce a corrected information packet; and processing the corrected information packet and the at least a second information packet to reconstruct the sequence of information.

18. The method of claim 15, further comprising the steps of:

prior to the step of receiving the first information packet over the first wireless communication channel, determining respective signal quality levels for a plurality of wireless communication channels that are available for use in the wireless communication network;

transmitting the signal quality levels to the second wireless device; and receiving an identification of the second wireless communication channel from the second wireless device, the second wireless communication channel being selected from the plurality of wireless communication channels based at least on the signal quality levels.

19. The method of claim 15, wherein the first wireless communication channel and the second wireless communication channel are two of a plurality of wireless communication channels available for use in the wireless communication network, the method further comprising the steps of:

determining a signal quality level of the second wireless communication channel;

transmitting the signal quality level to the second wireless device; and receiving an identification of a third wireless communication channel from the second wireless device in the event that at least one of (a) the signal quality level and (b) signal quality information determined by the second wireless device indicates unacceptable signal quality of the second wireless communication channel, the third wireless communication channel being selected from the plurality of wireless communication channels for use in retransmitting unsuccessfully received information packets.

20. The method of claim 15, wherein the first wireless communication channel is a time division duplex channel and wherein the step of informing the second wireless device comprises the step of:

transmitting an acknowledgment message to the second wireless device in a first time slot of a first time frame, the first time slot occurring later in time than a second time slot of the first time frame in which the first information packet was received, but earlier in time than commencement of a second time frame.

21. The method of claim 15, wherein the wireless communication network employs a time division multiple access protocol in which information is communicated in time slots arranged into time frames, wherein the first wireless communication channel is at least one time slot on a first carrier frequency and the second wireless communication channel is at least one time slot on a second carrier frequency, and wherein the step of receiving at least a second information packet on the first wireless communication channel comprises the step of:

receiving a second information packet in at least one time slot over the first carrier frequency during a time frame in which the first information packet is received in at least one time slot over the second carrier frequency.

22. The method of claim 15, wherein the information packets include real-time information and wherein the second wireless communication channel is used primarily in support of non-real-time information packet transmissions and secondarily for purposes of retransmitting unsuccessfully received, real-time information pockets.

23. A wireless base transceiver station system comprising:

a program memory that stores operating instructions for performing particular functions;

a controller that executes the operating instructions stored in the program memory to perform at least the following functions:

allocate wireless communication channels in support of communicating information packets to wireless electronic devices, control transmission of the information packets to the wireless electronic devices, and determine, based on at least one of information received and lack of information received from a first wireless electronic device, whether a first information packet transmitted to the first wireless electronic device was successfully received by the first wireless electronic device;

a transmitter, responsive to the controller, that transmits the first information packet to the first wireless electronic device over a first wireless communication channel, retransmits the first information packet to the first wireless electronic device over a second wireless communication channel in the event that the first information packet was not successfully received by the first wireless electronic device, and transmits at least a second information packet to the first wireless electronic device over the first wireless communication channel substantially contemporaneously with retransmitting the first information packet, wherein the first information packet and the at least a second information packet form a sequence of information; and a receiver, operably coupled to the controller, that receives information from the wireless electronic devices.

24. The wireless base transceiver station system of claim 23, further comprising:

a buffer memory, operably coupled to the controller, that stores the first information packet at least until the controller determines that the first information packet was successfully received by the first wireless electronic device.

25. A wireless device comprising:

a receiver that receives an initial transmission of a first information packet from a second wireless device over a first wireless communication channel, receives a retransmission of the first information packet over a second wireless communication channel in the event that the initial transmission of the first information packet was not acceptable, and receives at least a second information packet from the second wireless device over the first wireless communication channel substantially contemporaneously with receiving a retransmission of the first information packet, the first information packet and the at least a second information packet forming a sequence of information;

a program memory that stores operating instructions for performing particular functions;

a processor, operably coupled to the receiver and the program memory, that executes the operating instructions stored in the program memory to perform at least the following functions:

determine whether the initial transmission of the first information packet received from the second wireless device is acceptable;

inform the second wireless device as to whether the initial transmission of the first information packet is acceptable; and process the first information packet and the at least a second information packet to reconstruct the sequence of information upon successful reception of the first information packet and the at least a second information packet; and a transmitter, responsive to the processors that transmits information to the second wireless device.

26. The wireless device of claim 25, further comprising:

a buffer memory, operably coupled to the processor, tat stores the first information packet to produce a stored information packet until receipt of the first information packet over the second wireless communication channel in the event that the initial transmission of the first information packet was not acceptable; and wherein the operating instructions include instructions that, when executed by the processor, enable the processor to further perform the following functions:

combine the stored information packet with the first information packer received over the second wireless communication channel to produce a corrected information packet; and process the corrected information packet and the at least a second information packet to reconstruct the sequence of information.

27. The wireless device of claim 26, wherein the buffer memory further stores the at least a second information packet until receipt of the first information packet over the second wireless communication channel in the event that the initial transmission of the first information packet was not acceptable.

28. The wireless device of claim 25, further comprising:

a buffer memory, operably coupled to the processor, that stores the first information packet to produce a stored information packet until receipt of the first information packet over the second wireless communication channel in the event that the initial transmission of the first information packet was not acceptable; and wherein the operating instructions include instructions that, when executed by the processor, enable the processor to further perform the following functions:

replace the stored information packet with the first information packet received over the second wireless communication channel to produce a corrected information packet; and process the corrected information packet and the at least a second information packet to reconstruct the sequence of information.

29. The wireless device of claim 25, wherein the information transmitted by the transmitter includes an acknowledgment message indicating that the initial transmission of the first information packet was not acceptable.

* * * * *